3,564,045
METHOD FOR MAKING PROPYLENE GLYCOL EMULSIFIER
Ben W. Minshew, Decatur, Ill., assignor, by mesne assignments, to Continental Illinois National Bank and Trust Company of Chicago, Chicago, Ill.
No Drawing. Continuation of application Ser. No. 404,936, Oct. 19, 1964. This application Nov. 14, 1968, Ser. No. 775,903
Int. Cl. A23d 5/00; C11c 3/04
U.S. Cl. 260—410.6                                       7 Claims

ABSTRACT OF THE DISCLOSURE

A process for preparing propylene glycol mixed esters. An ester interchange reaction is promoted between propylene glycol and triglycerides in the presence of an alkali methyl alcoholate catalyst by heating at a temperature range of slightly above the melting point of the triglycerides to about 250° F. and then recovering the propylene glycol mixed esters.

REFERENCE TO RELATED APPLICATION

This application is a continuation application of my co-pending application Ser. No. 404,936, filed Oct. 19, 1964, now abandoned.

BACKGROUND OF THE INVENTION

Field of the invention and description of the prior art

This invention relates to an improved process for preparing a propylene glycol mixed ester composition which is particularly useful as an emulsifier in a shortening formulation such as used for dry cake mixes.

Today, it is common to utilize a propylene glycol mixed mono- and di-ester composition as an emulsifier for dry cake mix shortenings. Although there are various known commercial processes for manufacturing this composition, all such processes have certain significant disadvantages. One commonly used process involves an ester interchange reaction between propylene glycol and triglycerides. One disadvantage of all known processes using the ester interchange reaction is that the propylene glycol starting material must be used in surplus amounts and yet it is possible to obtain a yield no greater than about 93%. Furthermore, the known ester interchange processes require an undesirably long period of time to complete the reaction; the excessive time results in an undesired increase in the overall cost of production. Such known processes also require a reaction temperature in a rather high range, generally about 170–180° C.; at this high temperature range, costly equipment is required thereby adding to overall production costs. Still further drawbacks of some of the known emulsifier processes are that the resulting product has a strong emulsifier flavor and odor and become somewhat dark.

SUMMARY OF THE INVENTION

Therefore, it is an important object of this invention to provide an improved process for preparing a propylene glycol mixed ester composition useful as an emulsifier in a shortening formulation for dry cake mixes, wherein the disadvantages of known prior art ester interchange processes are substantially avoided.

It is also an object of this invention to provide an improved process for preparing a propylene glycol mixed ester emulsifier composition wherein the process may take place at reduced temperatures.

It is another object of this invention to provide an improved process for making a propylene glycol mixed ester emulsifier composition wherein the time required for completing the ester interchange reaction is substantially less than that found with prior art processes.

It is still another object of this invention to provide an improved process for making a propylene glycol mixed ester emulsifier composition wherein the product resulting from the process is enhanced in that the emulsifier does not exhibit a strong flavor or odor and there is substantially no undesired darkening of the resulting product.

Further purposes and objects of this invention will appear as the specification proceeds.

The foregoing objects are provided by my process for preparing propylene glycol mixed esters wherein the process comprises the steps of mixing but 1–20% by weight of propylene glycol with about 80–99% by weight of triglycerides, promoting an ester interchange reaction therebetween by heating the mixture to a temperature ranging from above the melting point of the triglycerides to about 250° F. in the presence of about 0.05–2% by weight of an alkali methyl alcoholate catalyst and recovering the mixed esthers.

DESCRIPTION OF THE PREFERRED EMBODIMENT

My improved process for manufacturing a propylene glycol mixed ester composition useful as a shortening emulsifier involves promoting an ester interchange reaction between propylene glycol and triglycerides or fat in the presence of a strong alkaline catalyst. The temperature range for the process extends over a surprisingly wide range, generally from a temperature slightly above the melting point of the particular fat or triglycerides starting material to about 350° F. although the preferred maximum temperature is considerably below 350° F.

The triglycerides used in my process are the various naturally occurring fats and oils include animal fats and oils such as lard, grease, and tallow and vegetable oils such as coconut oil, cottonseed oil, and soybean oil. The most commercially feasible and most extensive use of my process is in connection with lard. As an example of the make-up of one of the naturally occurring oils and fats, lard ordinarily comprises a mixture of triglycerides having the following alphatic hydrocarbon radicals: dodecyl, tetradecyl, tetradecenyl, hexadecyl, hexadecenyl, octadecyl, octadecenyl, octadecadienyl, and octadecatrienyl.

Propylene glycol is initially mixed with the triglyceride in suitable proportions. My process is operable when about 1–20% by weight of propylene glycol is mixed with about 80–99% by weight of the triglyceride, although it may be carried out in other proportions. Desirably, the propylene glycol is in a range of about 13–20% by weight while the optimum is about 13% by weight. When 13% by weight propylene glycol is used in combination with about 87% by weight triglyceride, the process is particularly economical and there is substantially a 100% recovery of the starting propylene glycol.

My process may be carried out over a rather wide temperature range, ranging from a point slightly above the melting point of the fat or triglyceride to about 350° F. In contrast to known processes which generally operate in excess of 350° F. in my process, the lower terperatures provide an emulsifier having improved quality since the product has substantially no darkening and does not have a strong odor or taste. Preferably the temperature range for my process ranges from about 150° F. to about 200° F. while the optimum temperature range is about 165–175° F.

An important aspect of my improved process is the selection of a catalyst which produces the advantages of my process. It has been found that the most satisfactory catalysts for use in connection with my process are the alkali methyl alcoholates including lithium methylate, sodium methylate, potassium methylate, rubidium methylate, and cesium methylate. A sodium methylate catalyst has been found to be particularly satisfactory in promoting the ester interchange reaction between the fat or triglyceride and the propylene glycol. Other useful catalysts for my process include inorganic salts, such as stannous chloride, zinc acetate, cobalt nitrate, ferrous hydroxide, bismuth nitrate, and titanium tetrachloride.

When the reaction temperature is maintained in the desired temperature range, the ester interchange reaction is very rapid. Generally, it is believed that the propylene glycol completes its reaction with the fats or triglycerides in about 5–10 minutes since there is a substantially complete dispersal of the propylene glycol in the fat within this time period. In order to assure complete reaction, the process preferably continues for about 1 hour.

After the reaction of the starting components has been completed, the active catalyst is inactivated, generally by the addition of phosphoric acid; the resulting sodium phosphate salts are removed from the product by filtration. The product resulting from my process generally comprises a mixture of propylene glycol mono-esters, propylene glycol di-esters, glycerol mono-esters, glycerol di-esters, triglycerides, and some free propylene glycol. Since the propylene glycol exists only in trace quantities, it is not required that it be removed from the mixture when it is formulated with other neutral base fats for production of shortenings using this type of emulsifier. Rather than using phosphoric acid for inactivating the catalyst, it is also possible to use water which would react with the catalyst to form soap, which is then readily removed from the resulting product. Also, various mineral or organic acids could be used to react with the catalyst in order to form mineral or organic salts which could be removed by filtration from the resulting mixture.

The following examples are provided in order to more fully illustrate my invention, but it is not intended that my invention is to be limited to the exact procedures, catalysts, temperature ranges, etc. shown therein, rather it is intended that all equivalents obvious to those having skill in the art are to be included within the scope of the invention, as claimed.

EXAMPLE I

A mixture of 99.5% prime steam lard and 0.5% propylene glycol was reacted at a temperature of 75° C. for 30 minutes under the influence of 0.1% sodium methylate. The reaction mixture was inactivated with 0.1% phosphoric acid and filtered. Analyses of the material as listed:

| | Percent |
|---|---|
| Monoglyceride | 1.3 |
| Propylene glycol mono-esters | 2.4 |
| Glycerol di-esters | 8.0 |
| Combined propylene glycol | 0.5 |

EXAMPLE II

A mixture of 43.5 pounds lard flakes and 6.5 pounds propylene glycol was treated under the influence of 0.2% sodium methylate at a temperature of 75° C. for one hour. The catalyst was inactivated with 0.2% phosphoric acid, filtered for the removal of phosphate salts, and the mixture analyzed as listed:

| | Percent |
|---|---|
| Monoglycerides | 14.7 |
| Combined propylene glycol | 9.7 |
| Free fatty acids | 0.77 |
| Free propylene glycol | 3.0 |

EXAMPLE III

A mixture of 2175 grams lard flakes and 325 grams propylene glycol was reacted in a laboratory vessel at 170° F. for 1 hour under the influence of 0.1% sodium methylate catalyst. The catalyst was interacted with 0.1% phosphoric acid and filtered. Analysis:

| | Percent |
|---|---|
| Free fatty acid | 0.56 |
| Monoglycerides | 14.3 |
| Combined propylene glycol | 11.9 |
| Propylene glycol mono-esters | 35.9 |
| Propylene glycol di-esters | 30.4 |
| Glycerol di-esters | 14.6 |
| Triglycerides | None |

EXAMPLE IV

A mixture of 2175 grams lard flakes and 325 grams propylene glycol was reacted under the influence of 2.5 grams (0.1%) sodium methylate for one hour at 200° F. The catalyst was inactivated with 0.1% phosphoric acid and filtered. Analysis:

| | Percent |
|---|---|
| Free fatty acid | 0.57 |
| Monoglycerides | 14.4 |
| Combined propylene glycol | 10.0 |
| Propylene glycol mono-esters | 31.6 |
| Propylene glycol di-esters | 23.8 |
| Glycerol di-esters | 5.0 |
| Triglycerides | 19.3 |

EXAMPLE V

A mixture of 2175 grams lard flakes and 325 grams propylene glycol was reacted under the influence of 2.5 grams (0.1%) sodium methylate for 1 hour at 225° F. The catalyst was inactivated with 0.1% phosphoric acid and filtered. Analysis:

| | Percent |
|---|---|
| Free fatty acid | 0.42 |
| Monoglycerides | 12.4 |
| Combined propylene glycol | 9.9 |
| Propylene glycol mono-esters | 36.6 |
| Propylene glycol di-esters | 13.4 |
| Glycerol di-esters | 13.5 |
| Triglycerides | 18.3 |

EXAMPLE VI

A mixture of 2175 grams lard flakes and 325 grams propylene glycol was reacted under the influence of 2.5 grams (0.1%) sodium methylate for 1 hour at 250° F. The catalyst was inactivated with 0.1% phosphoric acid and filtered. Analysis:

| | Percent |
|---|---|
| Free fatty acids | 0.51 |
| Monoglycerides | 11.1 |
| Combined propylene glycol | 8.16 |
| Propylene glycol mono-esters | 30.6 |
| Propylene glycol di-esters | 10.3 |
| Glycerol di-esters | 19.5 |
| Triglycerides | 22.8 |

What I claim and desire to secure by Letters Patent is:

1. An improved process for preparing propylene glycol mixed esters, said process comprising the steps of mixing about 1–20% by weight of propylene glycol with about 80–99% by weight of triglycerides, promoting an ester interchange reaction therebetween by heating the mixture to a temperature ranging from above the melting point of the triglycerides to about 250° F. in the presence of about 0.05–2% by weight of an alkali methyl alcoholate catalyst, and recovering said mixed esters.

2. The process of claim 1 wherein the heating step continues for at least about 5 minutes.

3. The process of claim 1 wherein about 13–20% by weight of propylene glycol are mixed with 80–87% by weight of triglycerides, said mixture is heated to a temperature of about 150–200° F., and the heating step continues for about 5–60 minutes in order to promote an ester interchange reaction between said propylene glycol and said triglycerides.

4. The process of claim 1 wherein about 13–20% by weight of propylene glycol is mixed with about 80–87% by weight of triglycerides in the presence of about 0.1–0.2% by weight of a sodium methylate catalyst, and said heating takes place at a temperature of about 150–200° F.

5. The process of claim 1 wherein about 13% by weight of propylene glycol is mixed with about 87% by weight of triglycerides in the presence of about 0.1–0.2% by weight of sodium methylate catalyst, said heating occurs at a temperature of about 165–175° F.

6. The process of claim 1 wherein about 13–20% by weight of propylene glycol is mixed with about 80–87% by weight of triglycerides and said heating occurs at about 150–200° F. in the presence of a sodium methylate catalyst for at least about 1 hour.

7. The process of claim 1 wherein about 13% by weight of propylene glycol is mixed with about 87% by weight of lard, and heating occurs at a temperature of about 165–175° F. in the presence of a sodium methylate catalyst for a period of about ½ hour to 1 hour.

References Cited

UNITED STATES PATENTS 3,097,098   7/1963   Allen et al. _____ 99—123

LEWIS GOTTS, Primary Examiner

D. G. RIVERS, Assistant Eaminer

U.S. Cl. X.R.

99—123; 260—410.7